(12) United States Patent
Weist

(10) Patent No.: US 8,544,910 B1
(45) Date of Patent: Oct. 1, 2013

(54) RECHARGEABLE DRILLING SHOVEL ASSEMBLY

(71) Applicant: Dennis Weist, Slatington, PA (US)

(72) Inventor: Dennis Weist, Slatington, PA (US)

(*) Notice: Subject to any disclaimer, the term of this patent is extended or adjusted under 35 U.S.C. 154(b) by 0 days.

(21) Appl. No.: 13/735,170

(22) Filed: Jan. 7, 2013

(51) Int. Cl.
*A01B 1/00* (2006.01)
*A01D 9/00* (2006.01)
*A01D 11/00* (2006.01)

(52) U.S. Cl.
USPC .......................................................... 294/49

(58) Field of Classification Search
USPC ................ 294/49, 59; 81/45, 46; 173/128, 173/211, 11, 13, 18; 299/37.5, 37.1, 37.3; 30/169, 170; 15/93.1
See application file for complete search history.

(56) References Cited

U.S. PATENT DOCUMENTS

| | | | |
|---|---|---|---|
| 1,575,275 A * | 3/1926 | Pearson | 294/8 |
| 2,279,324 A * | 4/1942 | Julien | 294/57 |
| D284,732 S | 7/1986 | Hozumi | |
| 4,730,860 A | 3/1988 | Padgett | |
| 5,104,166 A * | 4/1992 | Corsaro et al. | 294/8 |
| 5,865,490 A | 2/1999 | Vowell | |
| 5,887,920 A | 3/1999 | Perciful | |
| 6,047,651 A | 4/2000 | Wilson | |
| 6,128,979 A | 10/2000 | Shepherd | |
| 6,530,611 B2 * | 3/2003 | Moreth | 294/8 |
| 7,320,490 B2 | 1/2008 | Yakimchuk | |
| 8,303,239 B2 * | 11/2012 | Chu et al. | 414/744.2 |
| 2005/0248166 A1 | 11/2005 | Warren | |
| 2012/0103644 A1 | 5/2012 | Walsh et al. | |
| 2013/0087352 A1 * | 4/2013 | Rudy et al. | 172/48 |

* cited by examiner

*Primary Examiner* — Stephen Vu

(57) ABSTRACT

A rechargeable drilling shovel assembly drills downwardly, provides interchangeable spades, and charges a battery. The assembly includes a handle and a plurality of spade assemblies selectively couplable to the handle. A release lever, motor, trigger, gear, plunger, and charging port are coupled to the handle. The release lever is operationally coupled to the spade assembly when the spade assembly is coupled to the handle wherein manipulation of the release lever detaches the spade assembly from the handle. The trigger is operationally coupled to the motor wherein manipulation of the trigger actuates the motor. The gear is operationally coupled to the motor wherein actuation of the motor engages the gear. The plunger is operationally coupled to the gear wherein engaging the gear creates pressure on the spade assembly when the spade assembly is coupled to the handle. A battery powers the motor. A charging port is electrically coupled to the battery.

19 Claims, 5 Drawing Sheets

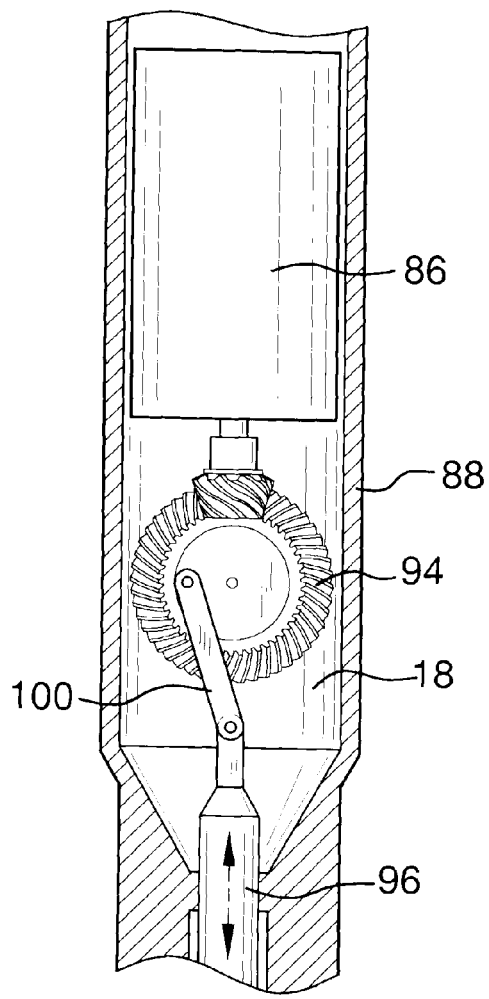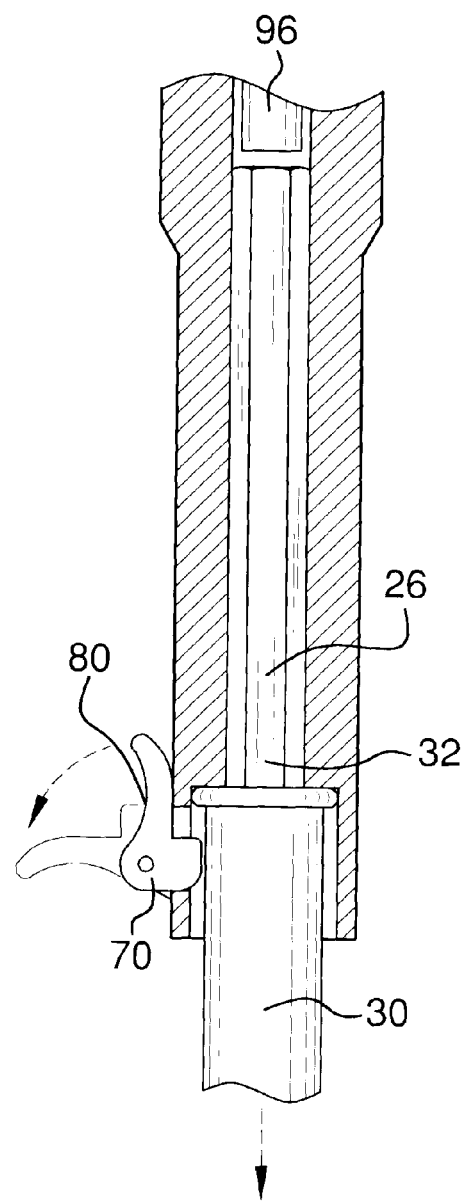
FIG. 4
FIG. 5

RECHARGEABLE DRILLING SHOVEL ASSEMBLY

BACKGROUND OF THE DISCLOSURE

Field of the Disclosure

The disclosure relates to shovel assemblies and more particularly pertains to a new shovel assembly for drilling into a ground surface, providing interchangeable spades for attachment to a shovel handle, and also charging the shovel's battery.

SUMMARY OF THE DISCLOSURE

An embodiment of the disclosure meets the needs presented above by generally comprising a handle and a plurality of spade assemblies. Each of the spade assemblies is selectively couplable to the handle. A release lever, a motor, a trigger, a gear, a plunger, and a charging port are coupled to the handle. The release lever is operationally coupled to the spade assembly when the spade assembly is coupled to the handle wherein manipulation of the release lever detaches the spade assembly from the handle. The trigger is operationally coupled to the motor wherein manipulation of the trigger actuates the motor. The gear is operationally coupled to the motor wherein actuation of the motor engages the gear. The plunger is operationally coupled to the gear wherein rotation of the gear creates downward pressure on the spade assembly when the spade assembly is coupled to the handle. A battery is coupled to the handle and powers the motor. A charging port is electrically coupled to the battery to selectively recharge the battery.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a cross-sectional view of an embodiment of the disclosure taken along line 4-4 of FIG. 2.

FIG. 5 is a cross-sectional view of an embodiment of the disclosure taken along line 5-5 of FIG. 2.

DESCRIPTION OF THE PREFERRED EMBODIMENT

Figure 1:
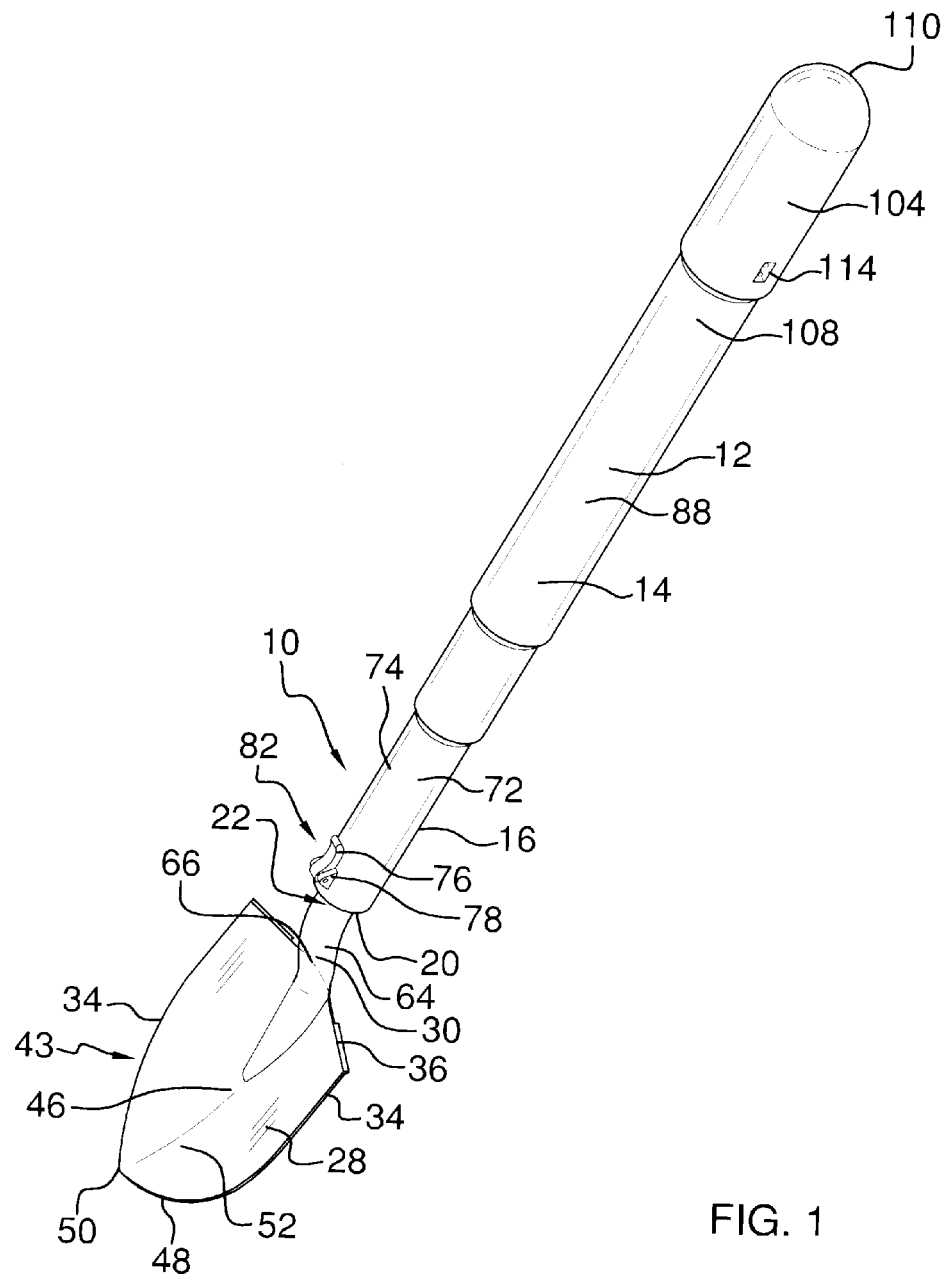
FIG. 1 is a top front side perspective view of a rechargeable drilling shovel assembly according to an embodiment of the disclosure.
Figure 2:
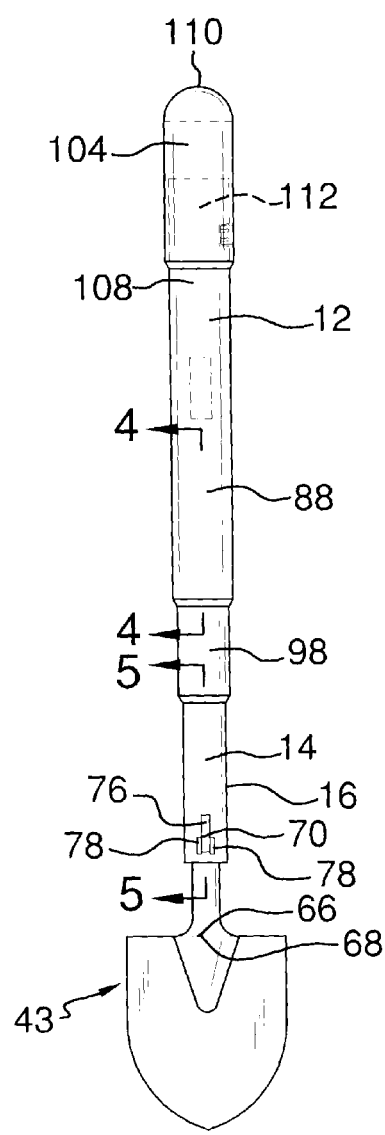
FIG. 2 is a front view of an embodiment of the disclosure.

With reference now to the drawings, and in particular to FIGS. 1 through 7 thereof, a new shovel assembly embodying the principles and concepts of an embodiment of the disclosure and generally designated by the reference numeral 10 will be described.

As best illustrated in FIGS. 1 through 7, the rechargeable drilling shovel assembly 10 generally comprises a handle 12 having a top side 14 and a perimeter wall 16 extending downward from the top side 14. The top side 14 and the perimeter wall 16 define an interior space 18 of the handle 12. A bottom edge 20 of the perimeter wall 16 defines an opening 22 into the interior space 18 of the handle 12. The bottom edge 20 is annular. The assembly 10 is made from materials conventionally used to construct shovels. The handle 12 is preferably made from aluminum.

A plurality of spade assemblies 24 is provided. Each of the spade assemblies 24 is selectively couplable to the handle 12. Each of the spade assemblies 24 comprises a rigid shaft 26, a spade 28, and a connector 30. A first end 32 of the shaft 26 extends into the opening 22 of the perimeter wall 16 when the spade assembly 24 is coupled to the handle 12. Each of the spades 28 is substantially parallel to the handle 12 when the spade 28 is coupled to the handle 12. Each of the spades 28 has a pair of sides 34 extending down from a top edge 36 of the spade 28. The spade 28 of a first one 38 of the spade assemblies 24 is substantially square-shaped wherein the first one 38 of the spade assemblies 24 defines a flat head shovel 39. The spade 28 of a second one 40 of the spade assemblies 24 is square-shaped and smaller than the first one 38 of the spade assemblies 24 wherein the second one 40 of the spade assemblies 24 defines a chisel 41. The spade 28 of each of a third one 42 and a fourth one 44 of the spade assemblies 24 has a depression 46 configured for scooping material onto the spade 28 wherein the third one 42 of the spade assemblies 24 defines a round point shovel 43 and the fourth one 44 of the spade assemblies 24 defines a scoop shovel 45. Each of the sides 34 of the round point shovel 34 has an arcuate end 48 meeting at a tip 50 positioned on a front end 52 of the spade 28. The sides 34 of the scoop shovel 45 bend outward from said top edge 36 of said spade 28 wherein the distance between said sides 34 on a top portion 33 of said spade 28 is smaller than a distance between said sides 34 on a bottom portion 35 of said spade 28. The spade 28 of a fifth one 54 of the spade assemblies 24 has an arcuate section 56 extending from a pair of opposing edges 58 of the spade 28 wherein the fifth one 54 of the spade assemblies 24 defines an edger 47. The connector 30 extends between and couples the shaft 26 to the spade 28. The connector 30 has a first portion 62 offset from a second portion 64. The second portion 64 is coupled to the top edge 36 of the spade 28. The second portion 64 is coupled to a center 66 of the top edge 36 of the spade 28. The connector 30 of each of the flat head shovel 39, the round point shovel 43, and the scoop shovel 45 extends into the top edge 36 of the spade 28. The top edge 36 of each of the spades 28 of round point shovel 43 and the scoop shovel 45 extends outward and downward from a medial section 68 of the connector 60.

Figure 3:
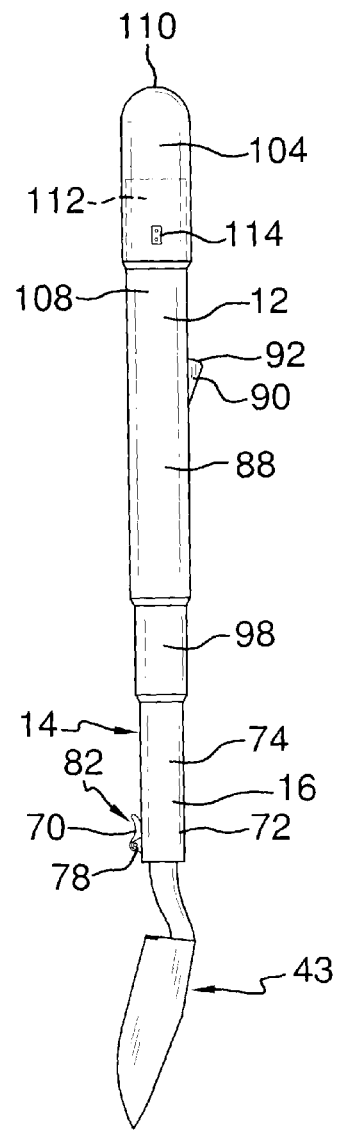
FIG. 3 is a side view of an embodiment of the disclosure.
Figure 6:
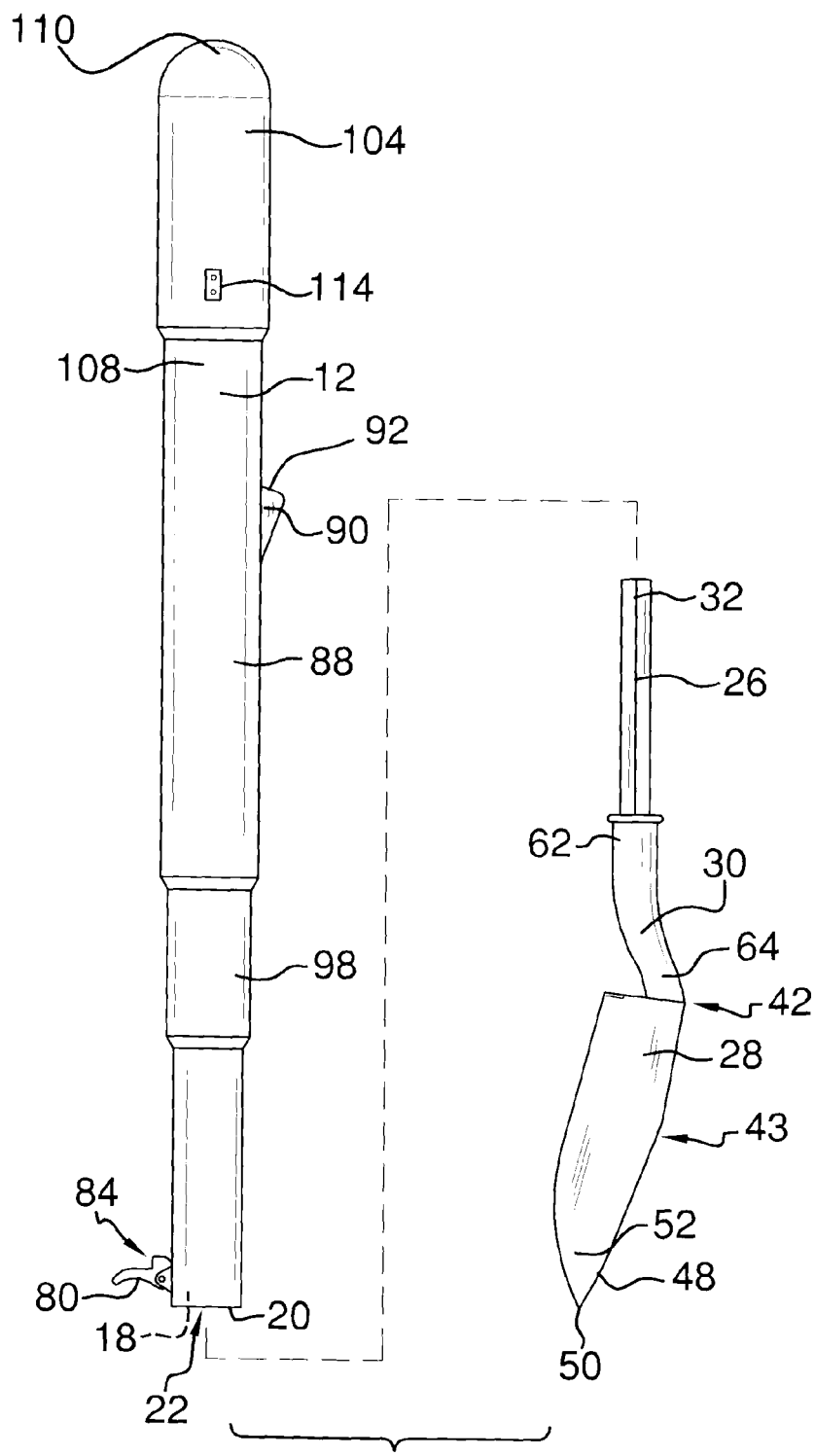
FIG. 6 is a partially-exploded side view of an embodiment of the disclosure.
Figure 7:
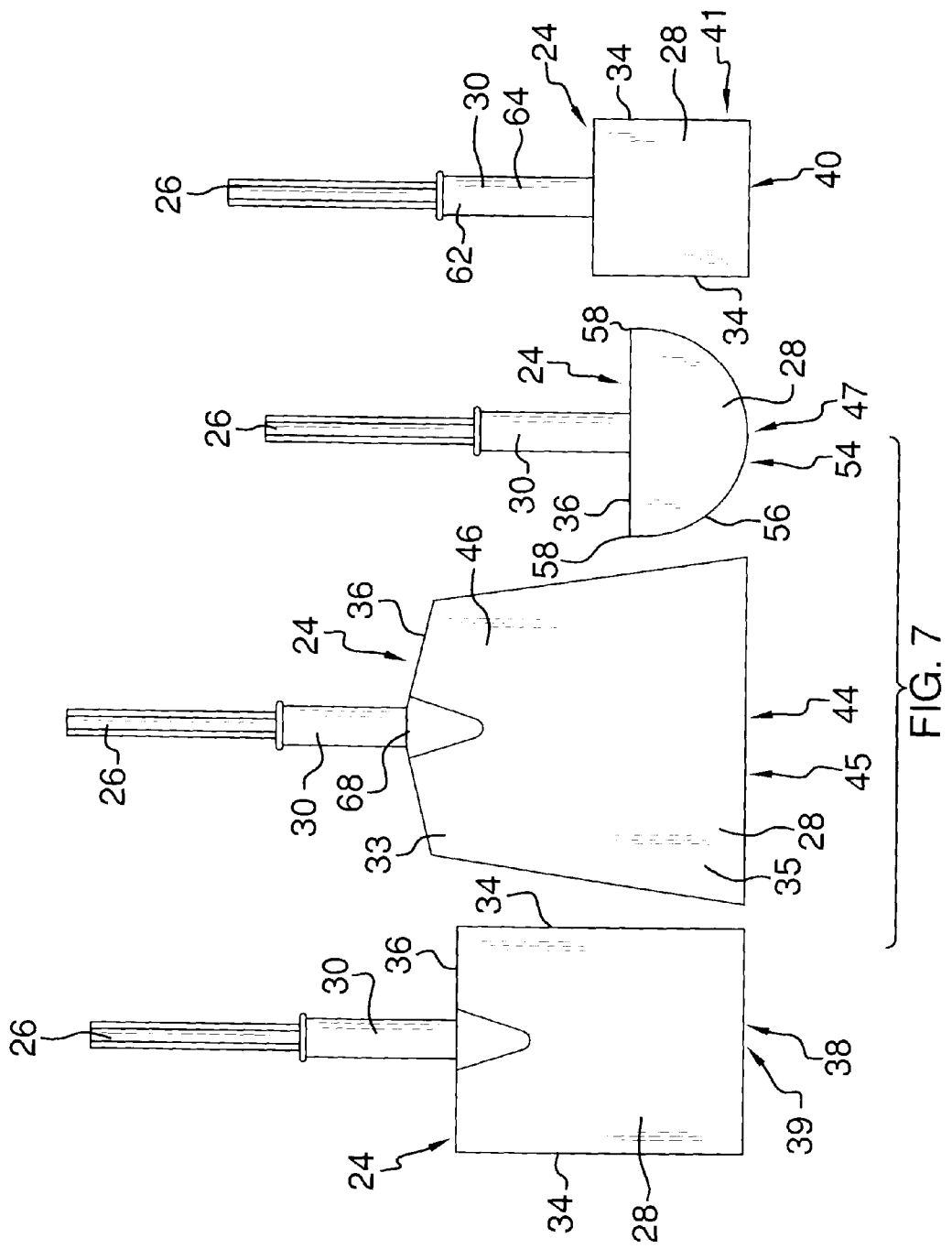
FIG. 7 is a front view of a plurality of spade assemblies of an embodiment of the disclosure.

A release lever 70 is coupled to the handle 12. The release lever 70 is coupled to an outside surface 72 of the handle 12. The release lever 70 is coupled to a third section 74 of the handle 12. The release lever 70 has a tab 76 coupled to and extending outward from a pair of spaced locking brackets 78. The tab 76 has a contour 80 extending inward toward the handle 12 when the release lever 70 is in an attached position 82. The release lever 70 is pivotable between the attached position 82 and a released position 84 wherein the tab 76 is pivoted away from the handle 12 and down toward the spade 28 when the release lever 70 is in the released position 84 and the tab 76 is pivoted upward toward the handle 12 and away from the spade 28 when the release lever 70 is in the attached position 82. The attached position 82 is shown in FIGS. 1 and 3. The released position 84 is shown in FIG. 6. The release lever 70 is operationally coupled to the spade assembly 24 when the spade assembly 24 is coupled to the handle 12 wherein manipulation of the tab 76 detaches the spade assembly 24 from the handle 12. The release lever 70 is contained with a spring.

A motor 86 is coupled to the handle. The motor 86 is coupled to a first section 88 of the handle 12. The motor 86 extends across the interior space 18 of the handle 12. The motor 86 has variable speeds. A trigger 90 is coupled to and extends from the handle 12. The trigger 90 is coupled to the first section 88 of the handle 12. The trigger 90 is coupled to the outside surface 72 of the handle 12. The trigger 90 is positioned parallel to the handle 12. The trigger 90 has a tapered arcuate edge 92 extending away from the handle 12. The trigger 90 is operationally coupled to the motor 86 wherein manipulation of the trigger 90 actuates the motor 86. A gear 94 is coupled to the handle 12. The gear 94 is coupled to the first section 88 of the handle 12. The gear 94 extends across the interior space 18 of the handle 12. The gear 94 is operationally coupled to the motor 86 wherein actuation of the motor 86 engages the gear 94 thereby causing the gear 94 to rotate. A plunger 96 is coupled to the handle 12. The plunger 96 extends longitudinally along the interior space 18 of the handle 12. The plunger 96 extends along a second section 98 of the handle 12 and is coupled to the first and the third sections 88, 74 of the handle 12. The plunger 96 is operationally coupled to the gear 94 wherein rotation of the gear 94 creates downward pressure on the spade assembly 24 when the spade assembly 24 is coupled to the handle 12 wherein the downward pressure drives the spade assembly 24 into a ground surface. The plunger 96 is made from steel. A coupler 100 couples the gear 94 to the plunger 96.

An end cap 104 of the handle 12 is provided. The end cap 104 is coupled to the first section 88 of the handle 12. A top end 108 of the first section 88 of the handle 12 is coupled to the end cap 104. The end cap 104 has an arcuate upper end 110. A battery 112 is coupled to the end cap 104. The battery 112 is configured to provide power to the motor 86. A charging port 114 is mounted on the end cap 104 and electrically coupled to the battery 112 to selectively recharge the battery 112 when the battery 112 is positioned in the charging port 114. A pair of batteries 112 may be provided wherein only one of the batteries 112 is required to operate the assembly 10 wherein each of the batteries 112 is interchangeable such that one of said batteries 112 can charge in the charging port 114 while the other of said batteries 112 can operate the assembly 10.

The length from the first section 88 of the handle 12 to the third section 74 of the handle 12 is between approximately 80 centimeters and 130 centimeters. The length from the first section 88 of the handle 12 to the tip 50 of the spade 28 is between approximately 120 centimeters and 180 centimeters. The length from the bottom edge 20 of the perimeter wall 16 to the tip 50 of the spade 28 is between approximately 20 centimeters and 70 centimeters. The length of the spade 28 of the flat head shovel 39 is between approximately 15 centimeters and 45 centimeters. The width of the spade 28 of the flat head shovel 39 is between approximately 12 centimeters and 40 centimeters. The length and width of the spade 28 of the chisel 41 is between approximately 3 centimeters and 28 centimeters. The length of the connector 30 of the chisel 41 and the edger 47 is between approximately 3 centimeters and 28 centimeters. The width of the opposing edges 58 of the edger 47 is between approximately 5 centimeters and 35 centimeters. The height of the spade 28 of the edger 47 is between approximately 3 centimeters and 28 centimeters. The height of the spade 28 of the scoop shovel 45 is between approximately 10 centimeters and 50 centimeters. The combined length of the connector 30 and the spade 28 of the scoop shovel 45 is between approximately 30 centimeters and 60 centimeters. The length between the sides 34 on a top portion 33 of the spade 28 of the scoop shovel 45 is between approximately 10 centimeters and 38 centimeters. The length between the sides 34 on a bottom portion 35 of the spade 28 of the scoop shovel 45 is between approximately 12 centimeters and 42 centimeters.

In use, as stated above and shown in the Figures, one of the spade assemblies 24 is coupled to the handle 12 and pushed into a ground surface. The battery 112 is coupled to the handle 12. Manipulation of the trigger 90 actuates the motor 86. Actuation of the motor 86 engages the gear 94 thereby causing the gear 94 to rotate. Rotation of the gear 94 creates downward pressure on the spade assembly 24 wherein the downward pressure drives the spade assembly 24 into the ground surface. The battery 112 is charged in the charging port 114.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A rechargeable drilling shovel assembly comprising:
a handle, said handle having a top side and a perimeter wall extending downward from said top side wherein said top side and said perimeter wall define an interior space of said handle;
a plurality of spade assemblies, each of said spade assemblies being selectively couplable to said handle;
a release lever coupled to said handle, said release lever being operationally coupled to said spade assembly when said spade assembly is coupled to said handle wherein manipulation of said release lever detaches said spade assembly from said handle;
a motor coupled to said handle;
a trigger coupled to and extending from said handle, said trigger being operationally coupled to said motor wherein manipulation of said trigger actuates said motor;
a gear coupled to said handle, said gear being operationally coupled to said motor wherein actuation of said motor engages said gear thereby causing said gear to rotate;
a plunger coupled to said handle, said plunger being operationally coupled to said gear wherein rotation of said gear creates downward pressure on said spade assembly when said spade assembly is coupled to said handle;

a battery coupled to said handle, said battery being configured to provide power to said motor; and a charging port coupled to said handle and electrically coupled to said battery to selectively recharge said battery when said battery is positioned in said charging port.

2. The assembly of claim 1, further comprising a bottom edge of said perimeter wall defining an opening into said interior space of said handle.

3. The assembly of claim 2, further comprising each of said spade assemblies comprising
a rigid shaft, a first end of said shaft extending into said opening of said perimeter wall when said spade assembly is coupled to said handle.

4. The assembly of claim 2, further comprising said motor, said gear, and said plunger extending across said interior space of said handle.

5. The assembly of claim 1, further comprising said spade of a first one of said spade assemblies being substantially square-shaped wherein said first one of said spade assemblies defines a flat head shovel.

6. The assembly of claim 1, further comprising said spade of a second one of said spade assemblies being square-shaped and smaller than said first one of said spade assemblies wherein said second one of said spade assemblies defines a chisel.

7. The assembly of claim 1, further comprising said spade of each of a third one and a fourth one of said spade assemblies having a depression configured for scooping material onto said spade wherein said third one of said spade assemblies defines a round point shovel and said fourth one of said spade assemblies defines a scoop shovel.

8. The assembly of claim 7, further comprising a pair of sides of said scoop shovel bending outward from a top edge of said spade wherein the distance between said sides on a top portion of said spade is smaller than a distance between said sides on a bottom portion of said spade.

9. The assembly of claim 1, further comprising said spade of a fifth one of said spade assemblies having an arcuate section extending from a pair of opposing edges of said spade wherein said fifth one of said spade assemblies defines an edger.

10. The assembly of claim 1, further comprising a connector extending between and coupling said shaft to said spade.

11. The assembly of claim 1, further comprising said motor having variable speeds.

12. The assembly of claim 1, further comprising said release lever having a tab coupled to and extending outward from a pair of spaced locking brackets, said release lever being pivotable between the attached position and a released position wherein said tab is pivoted away from said handle and down toward said spade when said release lever is in the released position and said tab is pivoted upward toward said handle and away from said spade when said release lever is in the attached position.

13. The assembly of claim 1, further comprising said trigger having a tapered arcuate edge extending away from said handle.

14. The assembly of claim 1, further comprising an end cap of said handle, said end cap being coupled to a first section of said handle, said end cap having an arcuate upper end.

15. The assembly of claim 14, further comprising said end cap being mounted on said charging port.

16. The assembly of claim 1, further comprising said trigger being positioned parallel to said handle.

17. The assembly of claim 1, further comprising said release lever and said trigger being coupled to an outside surface of said handle.

18. A rechargeable drilling shovel assembly comprising:
a handle having a top side and a perimeter wall extending downward from said top side wherein said top side and said perimeter wall define an interior space of said handle, a bottom edge of said perimeter wall defining an opening into said interior space of said handle, and a plurality of spade assemblies, each of said spade assemblies being selectively couplable to said handle, each of said spade assemblies comprising
a rigid shaft, a first end of said shaft extending into said opening of said perimeter wall when said spade assembly is coupled to said handle,
a spade, each said spade being substantially parallel to said handle when said spade is coupled to said handle, each said spade having a pair of sides extending down from a top edge of said spade, said spade of a first one of said spade assemblies being substantially square-shaped wherein said first one of said spade assemblies defines a flat head shovel, said spade of a second one of said spade assemblies being square-shaped and smaller than said first one of said spade assemblies wherein said second one of said spade assemblies defines a chisel, said spade of each of a third one and a fourth one of said spade assemblies having a depression configured for scooping material onto said spade wherein said third one of said spade assemblies defines a round point shovel and said fourth one of said spade assemblies defines a scoop shovel, each of said sides of said round point shovel having an arcuate end meeting at a tip positioned on a front end of said spade, said sides of said scoop shovel bending outward from said top edge of said spade wherein the distance between said sides on a top portion of said spade is smaller than a distance between said sides on a bottom portion of said spade, said spade of a fifth one of said spade assemblies having an arcuate section extending from a pair of opposing edges of said spade wherein said fifth one of said spade assemblies defines an edger, and
a connector extending between and coupling said shaft to said spade, said connector having a first portion offset from a second portion, said second portion being coupled to said top edge of said spade, said second portion being coupled to a center of said top edge of said spade, said connector of each of said flat head shovel, said round point shovel, and said scoop shovel extending into said top edge of said spade, said top edge of each of said spades of said round point shovel and said scoop shovel outward and downward from a medial section of said connector;

a release lever coupled to said handle, said release lever being coupled to an outside surface of said handle, said release lever being coupled to a third section of said handle, said release lever having a tab coupled to and extending outward from a pair of spaced locking brackets, said tab having a contour extending inward toward said handle when said release lever is in an attached position, said release lever being pivotable between the attached position and a released position wherein said tab is pivoted away from said handle and down toward said spade when said release lever is in the released position and said tab is pivoted upward toward said handle and away from said spade when said release lever is in the attached position, said release lever being operationally coupled to said spade assembly when said spade assembly is coupled to said handle wherein manipulation of said tab detaches said spade assembly from said handle;

a motor coupled to said handle, said motor being coupled to a first section of said handle, said motor extending across said interior space of said handle, said motor having variable speeds;

a trigger coupled to and extending from said handle, said trigger being coupled to said first section of said handle, said trigger being coupled to said outside surface of said handle, said trigger being positioned parallel to said handle, said trigger having a tapered arcuate edge extending away from said handle, said trigger being operationally coupled to said motor wherein manipulation of said trigger actuates said motor;

a gear coupled to said handle, said gear being coupled to said first section of said handle, said gear extending across said interior space of said handle, said gear being operationally coupled to said motor wherein actuation of said motor engages said gear thereby causing said gear to rotate;

a plunger coupled to said handle, said plunger extending longitudinally along said interior space of said handle, said plunger extending along a second section of said handle and being coupled to said first and said third sections of said handle, said plunger being operationally coupled to said gear wherein rotation of said gear creates downward pressure on said spade assembly when said spade assembly is coupled to said handle wherein the downward pressure drives said spade assembly into a ground surface;

a coupler coupling said gear to said plunger;

an end cap of said handle, said end cap being coupled to said first section of said handle, a top end of said first section of said handle being coupled to said end cap, said end cap having an arcuate upper end;

a battery coupled to said end cap, said battery being configured to provide power to said motor; and a charging port mounted on said end cap and electrically coupled to said battery to selectively recharge said battery when said battery is positioned in said charging port.

19. A rechargeable drilling shovel assembly comprising:

a handle;

a plurality of spade assemblies, each of said spade assemblies being selectively couplable to said handle;

a release lever coupled to said handle, said release lever being operationally coupled to said spade assembly when said spade assembly is coupled to said handle wherein manipulation of said release lever detaches said spade assembly from said handle;

a motor coupled to said handle;

a trigger coupled to and extending from said handle, said trigger being operationally coupled to said motor wherein manipulation of said trigger actuates said motor;

a gear coupled to said handle, said gear being operationally coupled to said motor wherein actuation of said motor engages said gear thereby causing said gear to rotate;

a plunger coupled to said handle, said plunger being operationally coupled to said gear wherein rotation of said gear creates downward pressure on said spade assembly when said spade assembly is coupled to said handle;

a battery coupled to said handle, said battery being configured to provide power to said motor;

a charging port coupled to said handle and electrically coupled to said battery to selectively recharge said battery when said battery is positioned in said charging port; and a connector extending between and coupling said shaft to said spade.

* * * * *